United States Patent
White (10) Patent No.: US 6,624,077 B2
(45) Date of Patent: Sep. 23, 2003

(54) INTEGRATED CIRCUIT WAVEGUIDE

(75) Inventor: John M. White, Hayward, CA (US)

(73) Assignee: Applied Materials, Inc., Santa Clara, CA (US)

( * ) Notice: Subject to any disclaimer, the term of this patent is extended or adjusted under 35 U.S.C. 154(b) by 61 days.

(21) Appl. No.: 10/023,571

(22) Filed: Dec. 17, 2001

(65) Prior Publication Data

US 2003/0114006 A1 Jun. 19, 2003

(51) Int. Cl.⁷ ............................................. H01L 21/00
(52) U.S. Cl. ..................... 438/692; 216/24; 216/38; 216/33; 216/39; 385/129; 385/131; 438/745; 438/735; 438/737
(58) Field of Search .................. 438/691, 692, 438/723, 745, 753, 756, 735, 737; 216/2, 24, 38, 33, 39, 41, 79, 88, 99; 385/129, 131, 132

(56) References Cited

U.S. PATENT DOCUMENTS

| | | | |
|---|---|---|---|
| 4,426,129 A | 1/1984 | Matsumura et al. | 350/96.33 |
| 4,578,097 A | 3/1986 | Berkey | 65/3.11 |
| 4,709,986 A | 12/1987 | Hicks, Jr. | 350/96.33 |
| 4,896,930 A | 1/1990 | Tsuchitani et al. | 350/96.12 |
| 4,904,052 A | 2/1990 | Rand et al. | 350/96.33 |
| 5,263,111 A | 11/1993 | Nurse et al. | 385/130 |
| 5,333,229 A | 7/1994 | Sayegh | 385/102 |
| 5,366,530 A | 11/1994 | Weber | 65/403 |
| 5,465,860 A | 11/1995 | Fujimoto et al. | 216/24 |
| 5,770,465 A | 6/1998 | MacDonald et al. | 437/67 |
| 6,097,870 A | 8/2000 | Ranka et al. | 385/127 |

*Primary Examiner*—William A. Powell
(74) *Attorney, Agent, or Firm*—Moser, Patterson & Sheridan, LLP (57) ABSTRACT

A method for forming an optical waveguide includes depositing a cladding material on a first substrate, forming a trench in the cladding material on the first substrate, and filling the trench with a optically conductive core material. The upper surface of the cladding material and the optically conductive core material are then planarized to produce a substantially planar surface. The method further includes depositing a cladding material on a second substrate, forming a mirror image trench into the cladding material on the second substrate, and filling the mirror image trench with the optically conductive core material. The upper surface of the second cladding layer and the core material therein is then planarized. Thereafter, the first substrate is affixed to the second substrate such that the trench and the mirror image trench are in abutment and form a substantially circular optical core.

30 Claims, 10 Drawing Sheets

INTEGRATED CIRCUIT WAVEGUIDE

BACKGROUND OF THE INVENTION

1. Field of the Invention

Embodiments of the invention generally relate to integrated circuit optical waveguides.

2. Description of the Related Art

As the demand for more powerful microprocessors increases, the interconnection technology within integrated circuits (ICs) must also advance in order to support the next generation of faster and more powerful microprocessors. Conventional ICs utilize electrical signals for data transmission. However, since an optical signal propagates at a velocity that is faster than the propagation velocity of an electrical signal, optical transmission mediums and interconnect devices have an inherent ability to transmit data at higher speeds. Therefore, optical signals offer great potential for increasing the signal transmission rate within ICs. Furthermore, several optical signals may share a single common optical transmission medium without interfering with each other. Alternatively, when more than one electrical signal occupies a transmission medium, interference often occurs. This interference, generally termed crosstalk, is defined as a disturbance caused by the electric and/or magnetic fields of a first signal affecting the electric and/or magnetic fields of a second signal in the same or an adjacent transmission medium. As a result of crosstalk, the signal transmission density is substantially greater for optical signal based systems than for electrical based systems. As a result of these differences, along with other advantages of optical based systems, optical signal transmission methods and processes are an attractive option for supporting the next generation of faster and more powerful ICs and microprocessors.

Current technology generally supports optical signal transmission through, for example, optical fiber networks. These optical fiber networks are generally supported by an infrastructure of individual optical fibers, fiber bundles, or other optically conductive transmission mediums. Optical fibers, which are the most common transmission medium for optical signals, generally include an outer shell or body portion that supports an inner optically conductive core portion. The optically conductive core generally has a diameter of approximately 8 micrometers. The terminating ends of the individual optical fibers are received by various optical devices, such as an optical waveguide, for example. An optical waveguide may include at least one optical signal input, an inner optical core portion that is conductive for optical signals and in optical communication with the optical signal input, and at least one optical signal output that is in optical communication with the optical core. These waveguides operate to receive an optical signal from a first optical signal source at an optical input, transmit the optical signal through the core portion of the waveguide, and disseminate the optical signal to another optical device or another optical transmission medium at an output of the waveguide. This process is ideally conducted with minimal loss or distortion to the optical signal as it travels through the waveguide.

Figure 1:
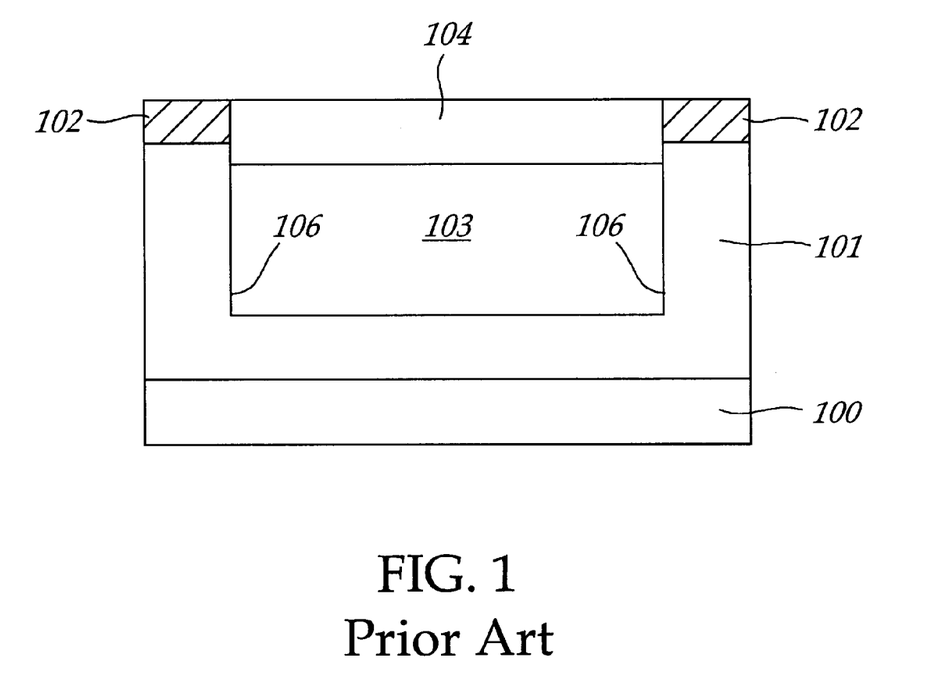
FIG. 1 illustrates a conventional IC optical waveguide.

Optical waveguides exist at multiple levels. For example, an optical waveguide may be used in larger devices, such as a router for an optical network. Optical waveguides may also be used in devices as small as ICs. Optical waveguides are used at the IC level to communicate optical signals between various IC components. U.S. Pat. No. 5,464,860 to Fujimoto describes a conventional IC waveguide and a method for manufacturing such, as illustrated in FIG. 1. The waveguide of Fujimoto is formed by depositing a cladding layer 101 on a substrate 100, and then depositing a metal layer 102 over the cladding layer 101. A trench 106 having a rectangular shape is then anisotropically etched into the middle of the cladding layer 101 through the metal layer 102. The trench 106 is then filled with an active waveguide polymer 103. The polymer layer 103 in the rectangular trench 106 is then etched back to a level below the metal layer 102 and the trench 106 is backfilled with an optically non-conductive buffer layer 104, which operates to optically isolate the polymer layer 103 in the rectangular trench 106.

However, conventional optical fiber cores are circular, and therefore, an inherent mismatch exists between the circular fiber core and the rectangular core of conventional IC waveguides. This mismatch represents a potential loss and/or degradation region for optical signals traveling from a fiber into a waveguide. Another problem with conventional IC optical waveguides is that the core is generally sized to approximate the core dimension of standard optical fibers, which is generally 8 micrometers. This poses a substantial problem, as the current trend is to manufacture high refractive index devices having substantially smaller core dimensions, in the range of between about 8 micrometers and about 2 micrometers. High refractive index cores allow the design of OIC's to be smaller as well as enable low-loss integration of silicon and class III/IV-based devices, such as lasers, amplifiers, detectors, and other devices into hybrid circuits. This presents a problem, as it is difficult to couple a standard 8 micrometer optical fiber to a device core that has a smaller dimension, for example ¼ that of the optical fiber size, or about 2 micrometers, without incurring substantial signal loss or degradation.

Therefore, there exists a need for a method for manufacturing an IC optical waveguide that eliminates coupling mismatch loss and/or signal degradation. Further, there exists a need for an IC optical waveguide capable of coupling to optical sources having a core dimension that is substantially larger than the core dimension of the optical waveguide.

SUMMARY OF THE INVENTION

Embodiments of the invention generally provide a method for manufacturing an IC optical waveguide. The method includes depositing a cladding material on a first substrate, forming a trench in the cladding material on the first substrate, and filling the trench with a optically conductive core material. The upper surface of the cladding material and the optically conductive core material are then planarized to produce a substantially planar surface. The method further includes depositing a cladding material on a second substrate, forming a mirror image trench into the cladding material on the second substrate, and filling the mirror image trench with the optically conductive core material. The upper surface of the second cladding layer and the core material therein is then planarized. Thereafter, the first substrate is affixed to the second substrate such that the trench and the mirror image trench are in abutment and form a substantially circular optical core.

Embodiments of the invention also provide a method for forming a substantially circular optical channel in a waveguide. The method includes depositing a cladding layer on a substrate, etching a first trench in the cladding layer, the first trench having a substantially semi-circular cross section, and etching a mirror trench in the cladding layer, the mirror trench also having a substantially semi-circular cross section. The first trench and the mirror trench are filled with an optically conductive core material, and the upper surface of the cladding layer and an area over the first trench and the mirror trench is planarized. Thereafter, the mirror trench is folded onto the first trench and affixed thereto to form a substantially circular optical core surrounded by a continuous cladding layer.

Embodiments of the invention further provide an optical waveguide having a circular optical core. The waveguide includes a bottom portion and a top portion that are affixed together to form the waveguide. The bottom portion includes a bottom substrate, a first dielectric cladding layer is deposited on the bottom substrate and has a substantially planar first outer surface, a semi-circular trench is formed in the first cladding layer, and an optically conductive core material is concentrically positioned in the semi-circular trench and having a first surface that is coplanar with the first outer surface. The top portion includes a top substrate, a second dielectric cladding layer is deposited on the top substrate and has a substantially planar second outer surface, a semi-circular mirror image trench is formed in the cladding layer, and an optically conductive core material is concentrically positioned in the semi-circular mirror image trench and has a second surface that is coplanar with the second outer surface. The top and bottom portions are affixed together through a lamination or epoxy process to form the optical waveguide having a substantially circular optical core.

Embodiments of the invention further provide for a tapered transition between a waveguide made of "low" refractive index material such as a quartz optical fiber and an OIC waveguide made of a higher refractive index material such as silicon, silicon nitride, or silicon oxy-nitride. By appropriately designing the mask used to create the photoresist pattern for wet etching the trenches of the respective waveguide halves, it is possible to create a tapered expansion in the "width" dimension of the trench, i.e., along the longitudinal axis of the trench. The resulting effect, once the two waveguide halves are assembled, is a waveguide that is tapered as it approaches the edge of the substrate. This tapered feature will provide a lower insertion loss for a standard quartz fiber transition to a waveguide on the substrate, when the waveguide is made of a material that has a refractive index that is higher than quartz.

Embodiments of the invention further provide an improved tapered transition between a waveguide made of "low" refractive index material such as a quartz optical fiber and an OIC waveguide made of a higher refractive index material. This can be accomplished by taking advantage of a phenomenon related to wet etching of planar substrates that is known as an "edge effect". By adjusting the etching bath chemistry, temperature, and circulation appropriately, it is possible to enhance the wet etch rate of the film near the edges of a substrate relative to the inner regions. By properly optimizing the bath conditions described, it is possible to achieve a deeper trench, as well as a wider trench near the edge of the substrate. The resulting effect, once the two waveguide halves are assembled, is a tapered "horn" shape to the waveguide as it approaches the edge of the substrate. This tapered feature provides a lower insertion loss for a standard quartz fiber transition to a waveguide on the substrate, when the waveguide is made of a material that has a refractive index that is higher than quartz.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Embodiments of the invention generally provide a waveguide for an integrated circuit. The waveguide of the invention includes a bottom portion having a substantially semi-circular optical path formed therein and a top portion having a mirror image of the substantially semi-circular optical path of the bottom portion formed therein. The top and bottom portions are affixed together with the respective optical paths adjacent each other, i.e., in abutment with each other. The combination of the substantially semi-circular optical path in the bottom portion and the mirror image substantially semi-circular optical path in the top portion creates a substantially circular optical path through the interior portion of the waveguide when assembled.

Figure 2A:
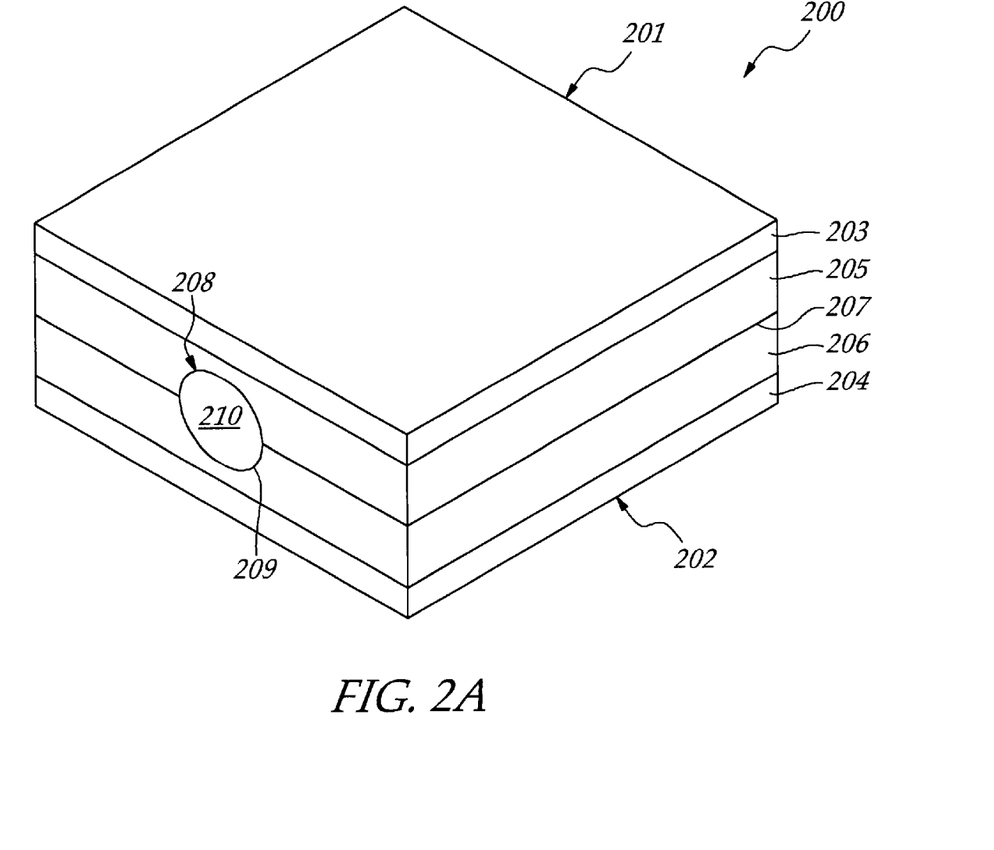
FIG. 2A illustrates a perspective view of an exemplary optical waveguide of the invention using a substrate and a cladding material.
Figure 3A:
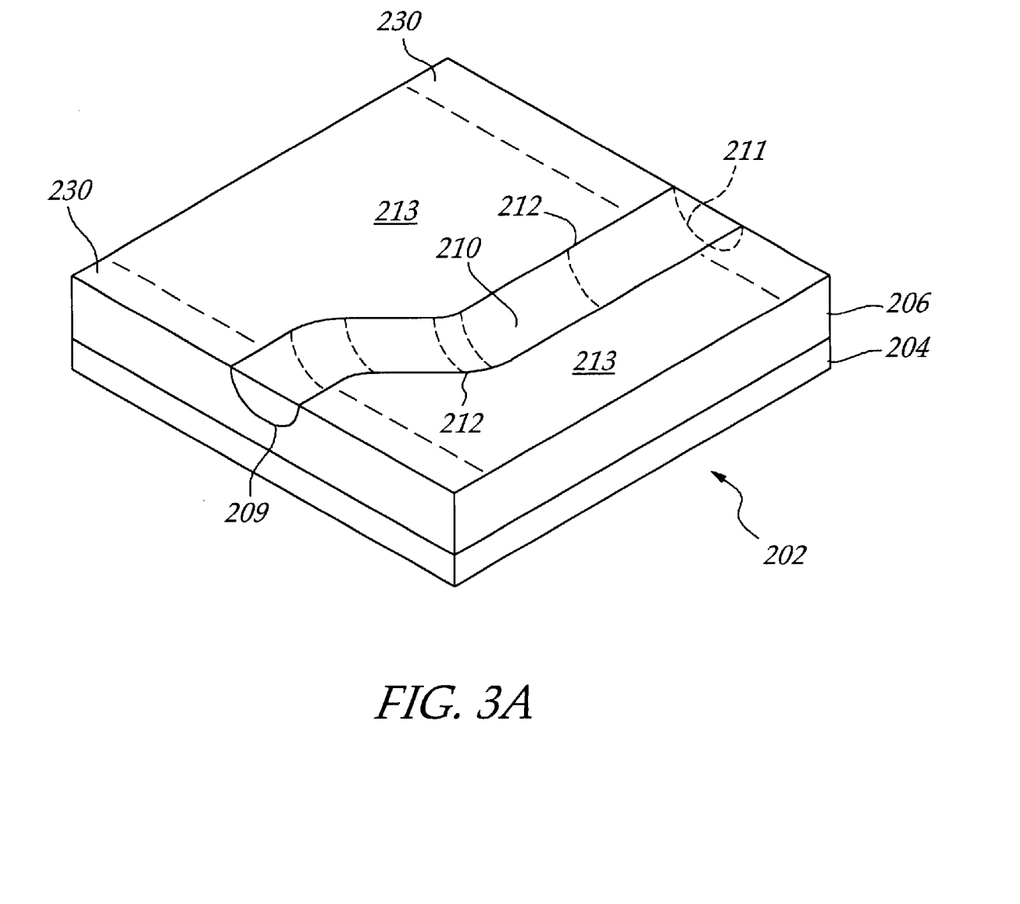
FIG. 3A illustrates a perspective view of a bottom half of an exemplary waveguide of the invention.

FIG. 2A illustrates a perspective view of an embodiment of an integrated circuit waveguide of the invention. The waveguide 200 generally includes a top portion 201 and a bottom portion 202. Bottom portion 202 may be formed on a semiconductor substrate 204, such as a silicon or gallium arsenide substrate, for example. The substrate 204 of bottom portion 202 has a cladding layer 206 deposited thereon, wherein a cladding material/layer is generally defined as a layer configured to confine an optical signal to an optical core surrounded by the cladding layer. Cladding layer 206 of the present invention may be a dielectric layer such as glass, plastic, ceramic, quartz, or another optically conductive material that may be deposited on a substrate, patterned by photolithography or other method, and then isotropically etched by a means such as wet chemical etching or isotropic dry etching. Cladding layer 206 has a trench or channel 212 of a substantially semi-circular cross section formed therein. Trench 212 generally has a cross-sectional radius that corresponds to or approximates a radius of the optical transmission medium that is to be secured to waveguide 200. The radius of trench 212 may be, for example, between about 0.5 and about 5 micrometers, thus allowing for connection to optical fibers having a core diameter of between about 1 micrometer and about 10 micrometers. However, it is contemplated that the radius of trench 212 may be manufactured to be larger or smaller in order to accommodate varying sizes of optical cores, both larger and possibly smaller. Trench 212 generally extends across the upper surface 213 of bottom portion 202 from a first substantially semi-circular opening 209 to a second substantially semi circular opening 211. Although trench 212 may or may not follow a linear path across surface 213, as shown in FIG. 3A, the cross-section of trench 212 generally remains substantially semi-circular with a constant radius along the longitudinal axis of trench 212.

Trench 212 is filled with an optically conductive core material 210 that is positioned within trench 212. Core material 210 may be an optically conductive dielectric material having low attenuation characteristics and a higher optical refractive index than the cladding material 206 surrounding the core material 210. Although not a requirement, it is generally preferred that core material 210 be selected from a group of materials that may be deposited through known semiconductor processing techniques, such as silicon, silicon nitride or silicon oxy-nitride. Core material 210 fills the substantially semi-circular cross section of trench 212 and has an upper surface that is substantially planar with the upper surface 213 of bottom portion 202, i.e., the cladding layer 206 upper surface 213. Core material 210 forms a three dimensional solid having a planar upper surface that corresponds to the outline of trench 212 in upper surface 213. As such, core material 210 shares a longitudinal axis with trench 212, ie., the radius of core material 210 corresponds to the radius of trench 212, and has a substantially semi-circular cross section that is generally uniform in shape along the longitudinal axis of the core 210. However, although the cross sectional shape generally remains substantially semi-circular, the size of the cross section may vary along the longitudinal axis of the core material 210, which will be further discussed herein.

Cladding layer 206 generally operates to reduce loss of optical signals from the core material 210, reduce optical scattering loss at the outer surface of core material 210, protect the core material 210 from absorbing contaminants, and to add mechanical strength to the core material 210. Additionally, the refractive index (n) of core material 210 is generally selected to be higher than that of cladding layer 206, such that the total reflection of the optical signal caused by the difference in the refractive index (density) of the core material 210 and the cladding layer 206 operates to maintain or channel the optical signal within the core material 210 and not allow the optical signal to be absorbed into the cladding layer 206. Additionally, the physical properties of the core material 210 may be selected to minimize attenuation, modal dispersion, and material dispersion.

Figure 3B:
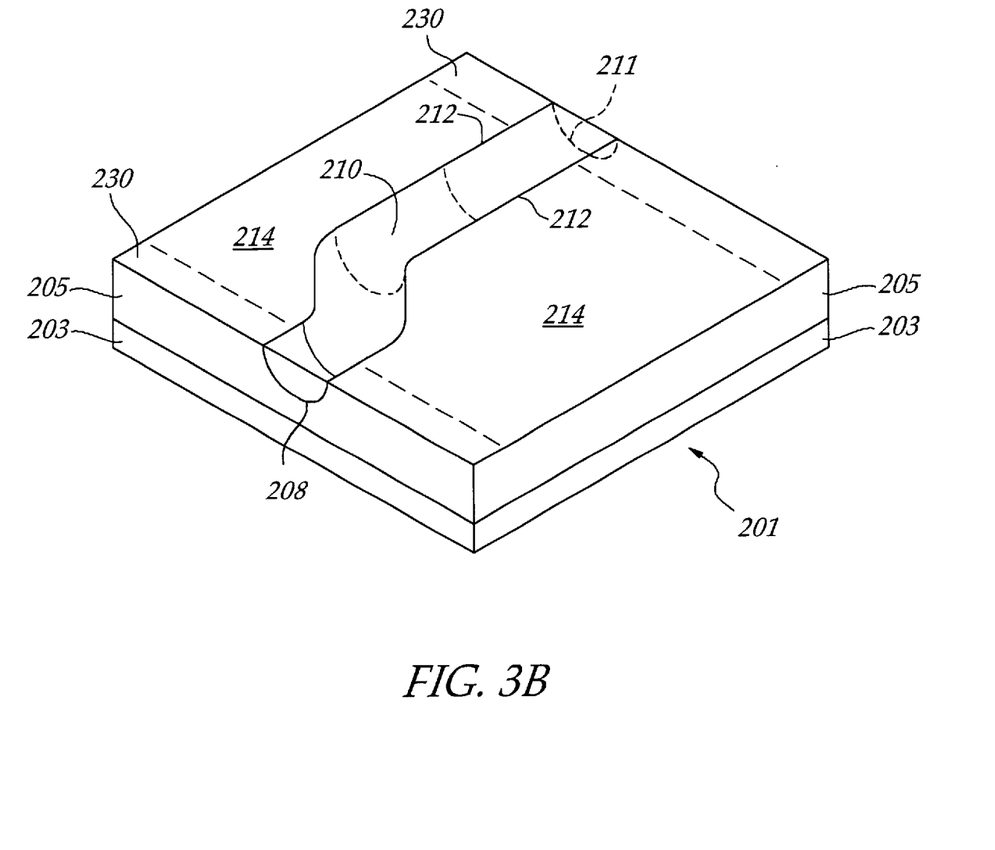
FIG. 3B illustrates a perspective view of a top half of an exemplary waveguide of the invention.

Top portion 201, which is shown in FIG. 3B, is structurally similar to bottom portion 202. Top portion 201 is also generally formed on a semiconductor substrate. The substrate 203 of bottom portion 201 has a cladding layer 205 having the same optical properties as cladding layer 206 of bottom portion 202 deposited thereon. Cladding layer 205 has a trench or channel 216 of a substantially semi-circular cross section formed therein, where the radius of trench 216 corresponds to the radius 212 of bottom portion 202. Trench 216 may generally extend across the lower surface 214 of top portion 201 from a first substantially semi-circular opening 208 to a second substantially semi circular opening 215. The path of trench 216 is generally configured to be a mirror image of trench 212 in bottom portion 202. In similar fashion to trench 212 of bottom portion, the cross-section of trench 216 remains substantially semi-circular along the axis of trench 216. Trench 216 is filled with the optically conductive core material 210. Core material 210 fills trench 216 and has an exposed surface that is substantially planar with the lower surface 214 of top portion 201.

Top portion 201 and bottom portion 202 are affixed together to form optical waveguide 200, as shown in FIG. 2A. The respective portions may be affixed together through an epoxy process, gluing process, a lamination process, a fusion process, or other process configured to secure or laminate two substantially planar substrates together. When the respective portions 201 and 202 are affixed together, trench 212 in bottom portion 202 aligns or abuts with trench 216 in top portion 201 to cooperatively form a substantially circular optical core portion 210. Core portion 210 is generally concentrically positioned within the substantially circular channel cooperatively formed by trenches 212-and 216. Core portion 210 generally terminates proximate a substantially circular outer opening formed by semi-circular openings 208 and 209. The surface of core 210 proximate the opening is generally planar and perpendicular to the longitudinal axis of the core material 210, which facilitates efficient optical connection thereto.

As noted above, the refractive index (n) of the core material of both bottom and top portions is generally selected to be higher than the refractive index of the cladding material. Additionally, the refractive index of the core material deposited in the bottom and top portions 201 and 202 is generally identical, so that when the respective portions are affixed together, a continuous core having a uniform refractive index is provided. Similarly, the refractive index of the cladding material deposited on the respective bottom and top portions 201 and 201 is also generally selected to be identical so that a uniform cladding material may be formed. The refractive index for free space is generally defined as 1, and silica glass, which is a common core material, has a refractive index of approximately 1.5. However, it is known that the refractive index for various materials, including optical core materials such as silica glass, may be varied through the introduction of dopants into the core material. Therefore, silica glass may be used for both the core material and the cladding material, if desired, as the refractive indexes of the core and cladding portions may be doped to create the desired difference in the respective refractive indexes. Further, embodiments of the invention contemplate that the core material may be air. In this configuration, the surface of the respective cladding layers is manufactured to reflect optical signals therefrom, which operates to transmit the optical signal through the core portion of the waveguide without a solid core material therein.

Figure 2B:
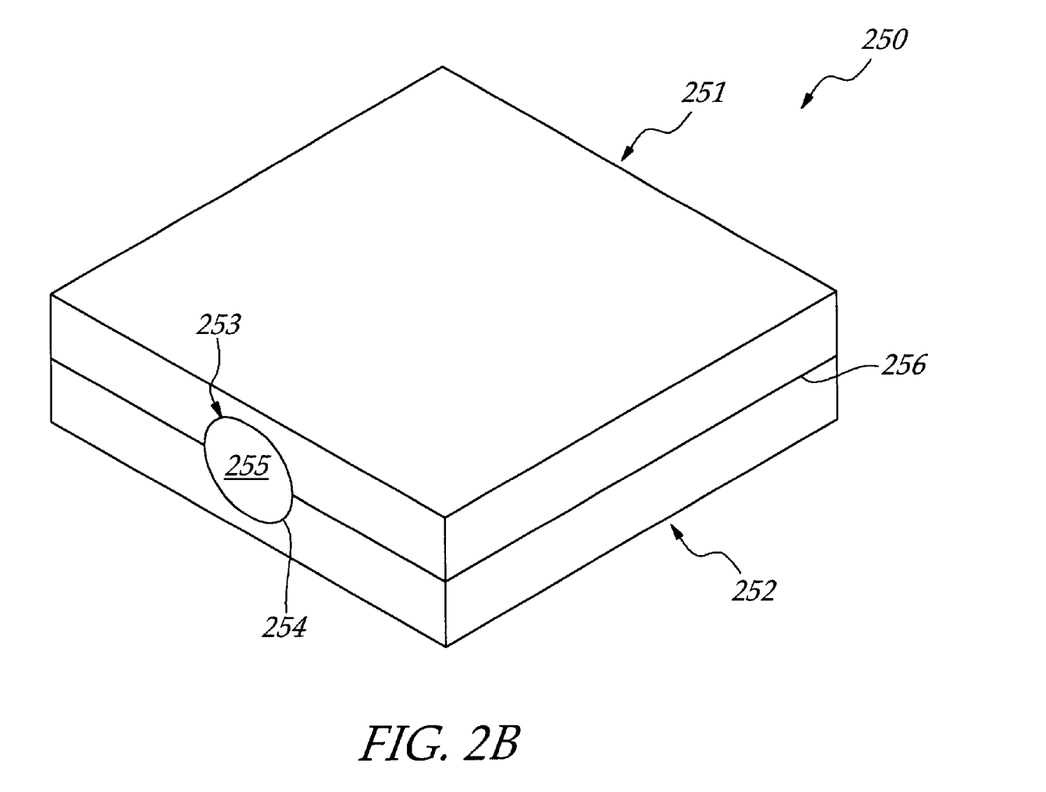
FIG. 2B illustrates a perspective view of an exemplary optical waveguide of the invention using a substrate as a cladding material.

FIG. 2B illustrates a perspective view of an embodiment of an integrated circuit waveguide of the invention, where the waveguide is formed directly on a substrate without a cladding layer. The waveguide 250 generally includes a top portion 251 and a bottom portion 252 that are affixed together to form a unitary waveguide 250, in similar fashion to the embodiment shown in FIG. 2A. However, in this embodiment, the substrate material for the top and bottom portions 251 and 252 is selected to have the desired optical properties of a cladding layer. Therefore, the optical trench or channel formed into each of top and bottom portions is etched directly into the substrate material, as no cladding material is deposited on the respective substrates. Thus the base substrate material may be a dielectric such as glass, plastic, ceramic, or another optically conductive material, that may be patterned by photolithography or other methods, and then isotropically etched by a means such as wet chemical etching or isotropic dry etching. The physical characteristics of waveguide 250, i.e., the formation of the trench, optical core, sizes and shapes of the respective elements, etc. are similar to the embodiment shown in FIG. 2A, less the fact that a cladding layer is not deposited on the base substrate material.

FIGS. 4A–4I illustrate an exemplary method for manufacturing an integrated circuit waveguide of the invention. The exemplary method illustrates the formation of a top or bottom portion of an exemplary waveguide, along with the process of affixing the two portions together. Thus, the process may be undertaken on two substrates, wherein one substrate is designated for the bottom portion of the waveguide and the other substrate is designated for the top portion of the waveguide. Once both portions are complete, they may be joined together to cooperatively form the exemplary waveguide of the invention. Alternatively, both bottom and top portions may be formed into a single substrate. The single substrate may then be separated into individual substrates and affixed together to form a unitary waveguide. Regardless of the particular method employed, both a bottom and top portion are created as mirror images of each other and affixed together to form the exemplary waveguide of the invention.

Figure 4A:
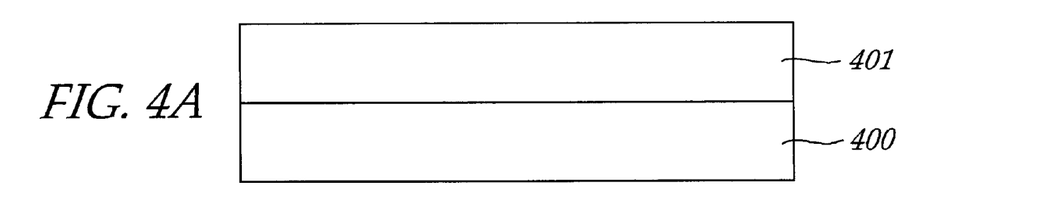
FIGS. 4A–4I illustrate an exemplary method for forming an integrated circuit waveguide.
Figure 4B:
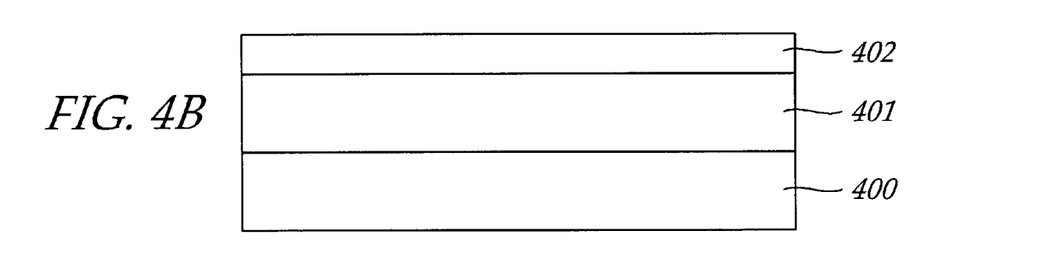
Figure 4C:
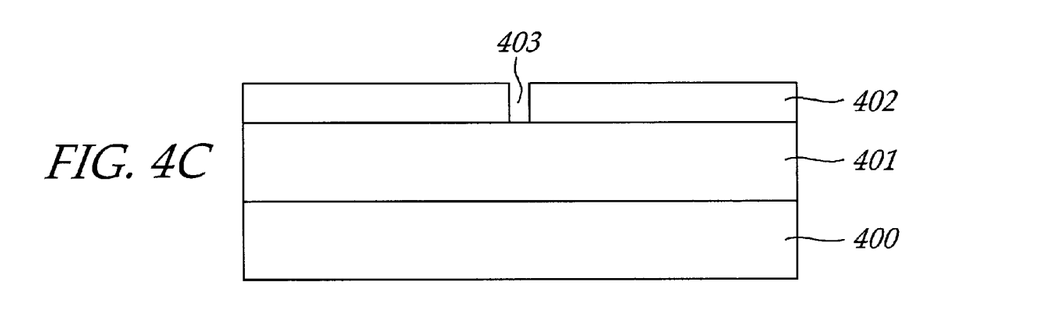

The exemplary method begins in FIG. 4A where a base substrate 400, which may represent the bottom portion 202 of the exemplary waveguide 200, has a cladding layer 401 deposited thereon. Cladding layer 401 may be deposited, for example, through a spin on process, a chemical vapor deposition process, a physical vapor deposition process, or another process suitable for depositing a dielectric/cladding layer on a substrate. Once the cladding layer 401 is deposited on the substrate 400, a mask layer 402 is deposited on top of the cladding layer 401, as shown in FIG. 4B. Mask layer 402 is preferably deposited by a spin on process, however, it is contemplated that other deposition methods, such as a chemical vapor deposition process, a physical vapor deposition process, or another process or combination of processes suitable for depositing a mask layer 402, may be implemented in order to form the mask layer 402 on top of the cladding layer 401. Once the mask layer 402 is formed, an aperture or mask hole 403 is formed into mask layer 402, as illustrated in FIG. 4C. The aperture 403 may be formed into mask layer 402 by a photolithography process, i e., photolithographically exposing the mask layer in order to pattern it, and then removing the aperture portion 403 of mask layer 402 through, for example, an etch process that is selective to the patterned area corresponding to the aperture 403.

Figure 4D:
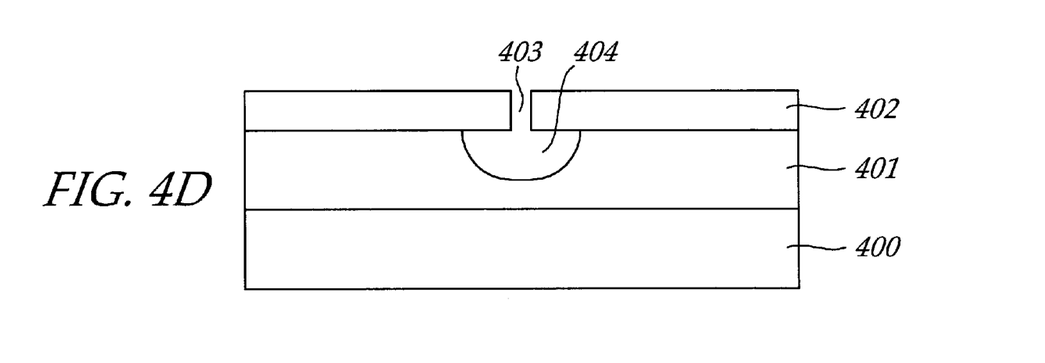

Once aperture 403 is formed into mask layer 402, a wet isotropic etch process, i.e., one that characteristically etches into the exposed underlying material in all directions at an equal rate, is applied. The etch process chosen will selectively attack the underlying cladding layer 401 and not the mask layer 402. Therefore, when the etchant is applied to the upper surface of mask layer 402, the etchant does not substantially degrade or diminish the thickness of mask layer 402. However, a portion of the etchant is allowed to contact the cladding layer 401 through the aperture 403 formed in mask layer 402. As a result of the etch selectivity to the cladding layer 401, the etchant that contacts the cladding layer 401 etches the cladding layer 401, as illustrated in FIG. 4D. If a silica glass cladding layer is used, for example, a solution of ammonium fluoride and hydrogen fluoride in water may be used to isotropically etch the silica cladding material.

Figure 4E:
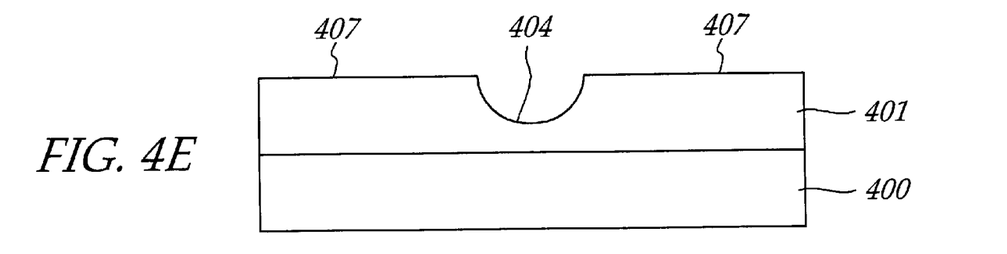

The etching process illustrated in FIG. 4D operates to form a cavity 404, as illustrated in FIG. 4E, that is substantially semi-circular in cross-section into the cladding layer 401 immediately below the aperture 403 in mask layer 402. The formation of a substantially semi-circular cavity 404 in the cladding layer is important to the present invention, as the geometry of the cavity 404 affects the optical performance of waveguide 200, particularly at an end of the waveguide where an optical fiber connection is made. In order for cavity 404 to be formed in a substantially semi-circular shape, the width of aperture 403 must be carefully selected. For example, since an isotropic etch process may be used to form cavity 404, the width of aperture 403 should be minimized, as the larger aperture 403 becomes, the less semi-circular cavity 404 will be. For example, if aperture 403 is 3 micrometers wide, then the cavity 404 will have a flat spot that is 3 micrometers wide, assuming that an isotropic etch process is used to form cavity 404. However, if aperture 403 is too small, then it becomes difficult to supply etchant to the exposed cladding layer through the aperture 403, which substantially slows the etching process and negatively impacts manufacturing throughput. Therefore, the width (w) of aperture 403 in mask layer 402 is carefully selected such that the particular isotropic etch process employed will generate a substantially semi-circular cavity 404 that has a radius that corresponds to the optical core size to be connected to the waveguide in an efficient time period.

Figure 5:
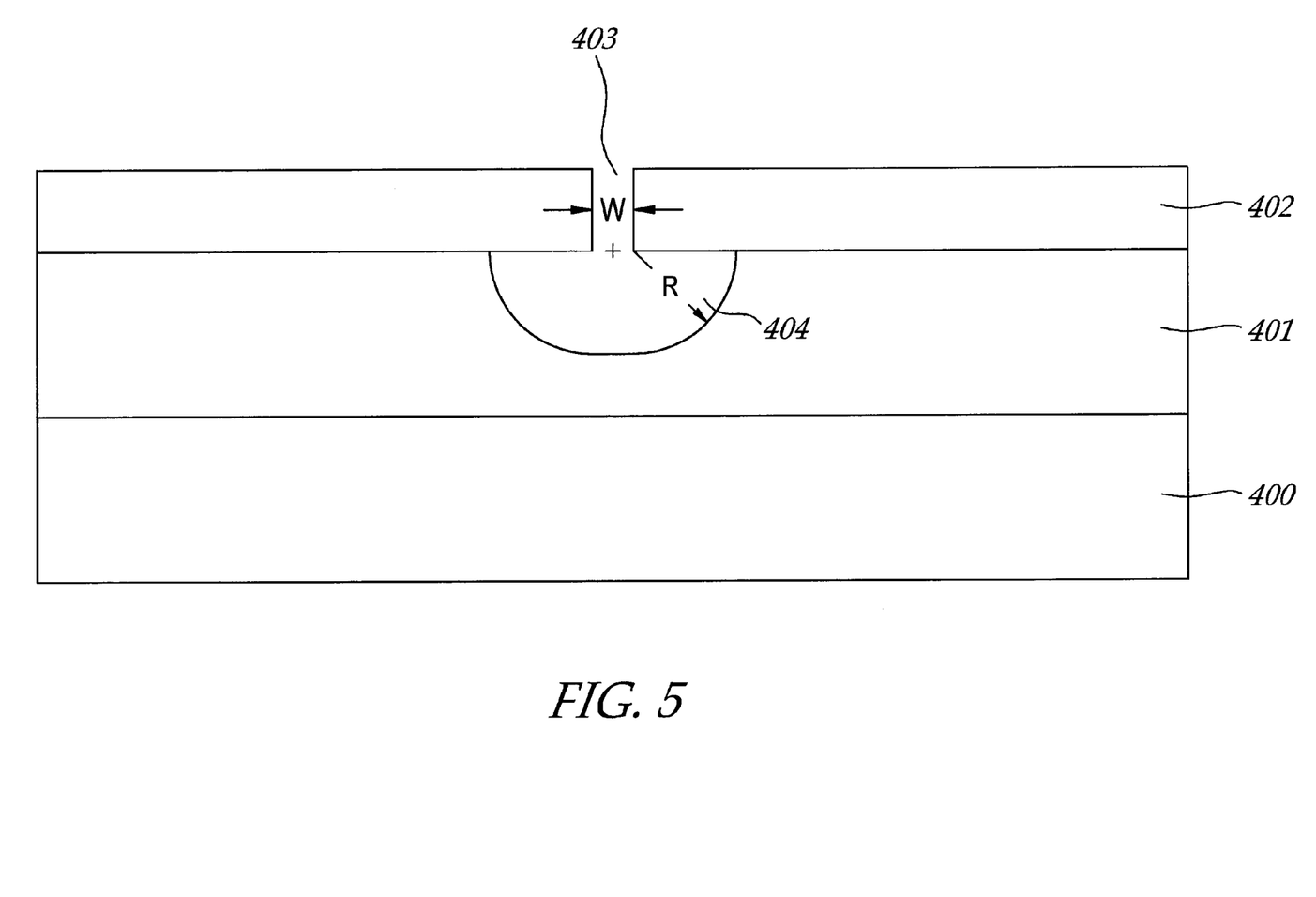
FIG. 5 illustrates detailed sectional view of the bottom portion of an exemplary waveguide of the invention.

For example, if the core diameter of an optical fiber to be attached to an optical waveguide of the invention is 8 micrometers, then the aperture 403 width may be approximately 1 micrometer. Using this aperture size, cavity 404 may be isotropically etched to a radius of 3.5 micrometers, which generates a substantially semicircular cavity 404 having a cross sectional diameter of approximately 8 micrometers, as illustrated in FIG. 5. The 8 micrometer cross sectional diameter is a result of a radial etch of 6 micrometers (3.5 micrometers in each direction (R)—7 micrometers total—from the center of aperture 403, plus the 1 micrometer width (W) of aperture 403). The resulting core shape, once the core material is deposited into the respective trenches and the respective top and bottom portions are affixed together, is a substantially circular core having 2 flat spots on opposite sides of the core, where the width of the 2 flat spots is 1 micrometer each (corresponding to the width of aperture 403). Using this process, the width of aperture 403 may be increased or decreased in order to generate the desired core cross section.

Figure 4F:
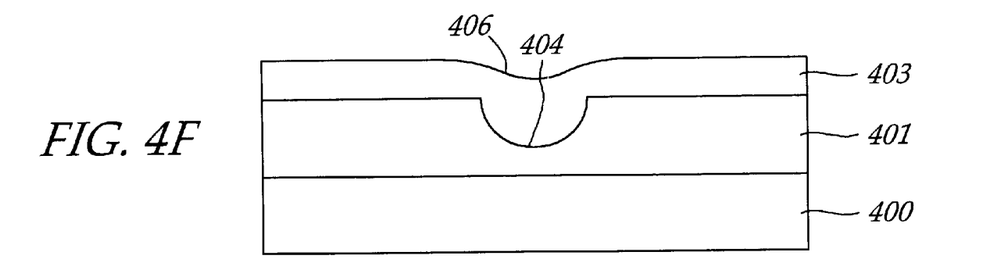

Once cavity 404 is formed, the mask layer 402 may be removed from cladding layer 401. The removal of mask layer 402 may be accomplished through an etch process, where an etchant that is selective to the mask layer is applied to the mask layer 402. In this situation, the mask layer 402 is removed while the etchant does not etch the cladding layer 401. Once the mask layer 402 is removed as illustrated in FIG. 4E, a layer of core material 405 may be deposited on top of the cladding layer 401, as illustrated in FIG. 4F. However, the surface of cavity 404 may be conditioned, smoothed, and/or rinsed prior to core material 405 being deposited therein in order to generate a surface that facilitates optimal optical signal transmission through core material 405, where optimal signal transmission is generally defined as transmission of an optical signal with minimal dispersion, polarization dependence, attenuation, or other characteristics that are undesirable for optical signal transmission. The core material 405 may be deposited through, for example, a spin on deposition process, a chemical vapor deposition process, a physical vapor deposition process, or another process known to be effective in depositing an optical core material onto a cladding layer. The core material 405 may blanket cover the surface of cladding layer 401 and cavity 404. The deposition thickness of core material 405 is calculated to completely fill cavity 404. However, the deposition process of core material 405 often results in a non-planar upper surface as a result of the core material 405 filling in cavity 404. This process often yields a depression 406 in the upper surface of the core material 405 layer. Therefore, the deposition thickness of core material layer 405 should be sufficient to ensure that the lowest portion of depression 406 is above a plane formed by the upper surface of cladding layer 401, as illustrated in FIG. 4F.

Figure 4G:
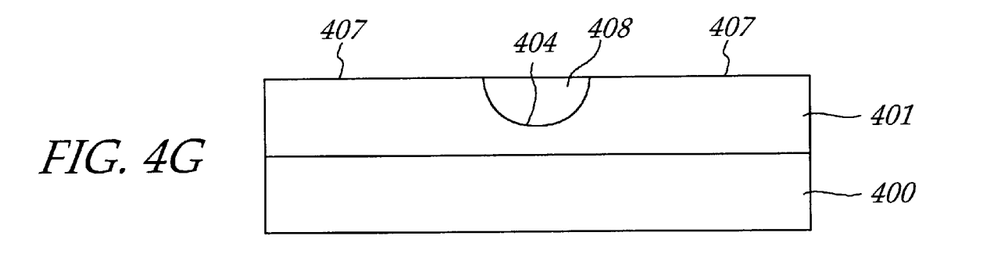

Therefore, once the core material 405 is deposited on top of the cladding layer 401, a planarization process, such as chemical mechanical polishing or an etch back process, for example, may be used to planarize the upper surface of the bottom portion 202. This planarization process may be used to remove the layer of core material 405 that has been deposited on top of the cladding layer 401 outside of the perimeter of the cavity portion 404, as illustrated in FIG. 4G. The planarization process, once complete, will generate a substrate 400 having a cladding layer 401 formed thereon or a cladding layer alone if the cladding layer is also serving as the substrate, wherein the cladding layer includes a substantially semi-circular cavity 404 formed therein that is filled with a core material 405. As a result of the planarization process, the upper surface 407 of the cladding layer 401 and core material 405 is generally planar and free of any remaining core material 405. However, the core material deposited in cavity 408 remains after planarization and forms a substantially semi-circular shaped optical core 408 having an upper planar surface that is planar with the upper surface 407 of the cladding layer 401. It is important that the upper surface of the core material 408 be planar, as this surface will form a contact surface with an optical core portion of the top portion of the waveguide. Thus, if the core surface is not planar, gaps will be formed with the top portion affixed to the bottom portion, and these gaps may have a substantial detrimental affect on the optical properties of the core. Therefore, the planarization step not only operates to provide a planar upper surface for optimal optical contact, but also operates to remove the core material 405 from all areas outside the trench region.

Figure 4H:
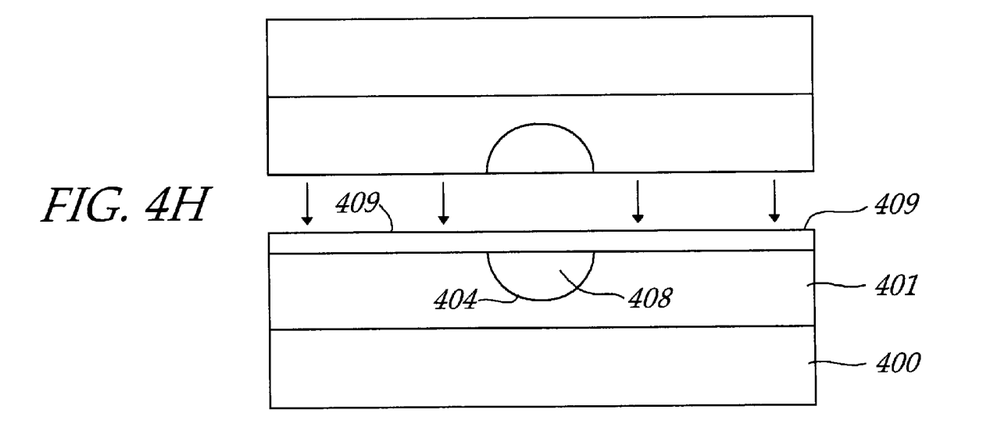
Figure 4I:
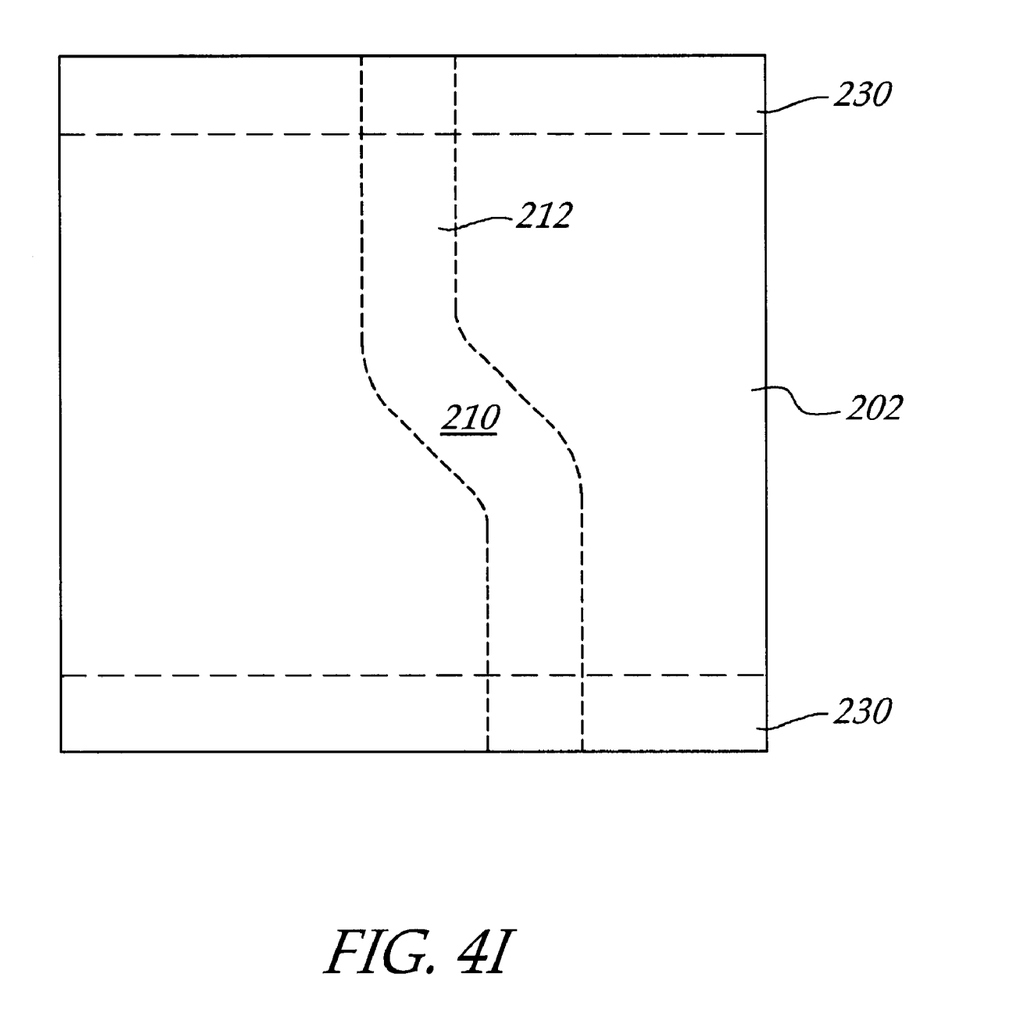

Once the additional core material has been removed from the upper surface 407 of the cladding material 401, the bottom portion 202 is ready to be affixed to a top portion 201 to form a complete waveguide 200. FIG. 4H illustrates an exemplary bottom portion 202 being affixed to a top portion 201. The bottom portion 202 may be affixed to the top portion 201 through a gluing process, a fusion process, a lamination process, an epoxy process, a mechanical clamping process, or other process suitable for affixing substrates together. In a gluing process, for example, a thin layer of optically conductive adhesive 409, such as an epoxy or an acrylic-based adhesive may be deposited on the upper surface 407 of the cladding layer 401. The top portion 201 may then be abutted to the upper surface 407 and secured thereto by the adhesive 409. However, it is important that the adhesive have similar optical properties to the core material, so that the adhesive layer does not scatter or otherwise substantially degrade the optical signals traveling along the axis of the core. Alternatively, the adhesive 409 may be deposited only on the upper surface 407 of the cladding layer 401, i.e., not over the core portion 408. The respective portions may then be affixed together such that the optical core 408 of the bottom portion directly abuts the optical core of the top portion being affixed thereto. However, in this configuration, no adhesive would be present in the core abatement region. Alternatively the top and bottom portions may be affixed to one another without use of any adhesive or fusion bonding of the contacting surfaces, for example through use of an external mechanical clamp. Regardless of the method used to affix the respective portions together, the method should generally be configured to secure the portions together such that the respective cores are in abutment and are capable of transmitting optical signals therethrough with minimal disturbance to the optical signal as the signal passes through in the direction substantially parallel to the abutment zone, i.e., along the longitudinal axis of the core material 210.

Once the respective top and bottom portions are affixed together, the end portions 230 may be removed. End portions 230 generally represent the outer or terminating edge of the top and bottom portions on the side that the optical core is exposed, as illustrated in FIGS. 3A and 3B. End portions 230 may be removed by a mechanical cutting operation, such as a saw or grind-type of operation configured to be utilized on semiconductor substrates. Once the end portions 230 are removed, the edge of the substrate, including the exposed terminating core end, may be polished to a smooth planar surface. The polishing process operates to generate a surface that is conducive to optical connections, i.e., a smooth planar surface, where the exposed surface of the core material is generally smooth, planar, and perpendicular to the longitudinal axis of the optical core.

In another embodiment of the invention the bottom and top portions of the waveguide are formed into a cladding layer on a single substrate or on a single material which serves both as the substrate and as the cladding material. A single mask is applied to the cladding layer, where the mask includes apertures formed therein corresponding to both the bottom layer trench and the mirror trench. Both trenches may be etched at the same time though an isotropic etching process to form semi-circular trench cross sections. Once the trenches are etched, the trenches may be filled with an optically conductive core material. The upper surface of the cladding layer and the optically conductive core material are then planarized. Once the core material is deposited into the trenches and the upper surface planarized, the substrate may be separated into two portions, a first portion having the bottom layer trench and a second portion having the top portion mirror image trench therein. The respective top and bottom portions are then folded over onto each other and affixed together to form a waveguide having a substantially circular cross section.

Figure 6:
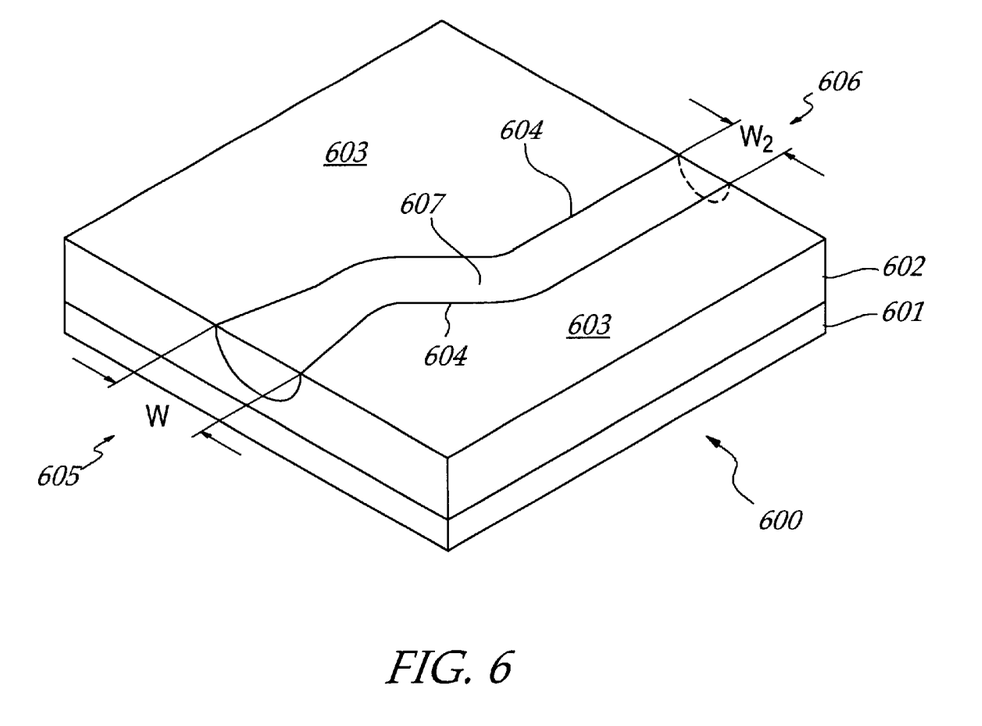
FIG. 6 illustrates an exemplary embodiment of a waveguide of the invention configured to receive various sizes of optical connections.

In another embodiment of the invention a waveguide capable of receiving an optical fiber of a first diameter and transmitting the optical signal therefrom to an optical core of a smaller second diameter is provided. In similar fashion to the previous embodiments, the waveguide includes a top and bottom portions that are affixed together. An exemplary bottom portion 600 of the waveguide, as illustrated in FIG. 6, is formed on a substrate 601. The substrate 601 has a dielectric cladding layer 602 deposited thereon, the dielectric cladding layer 601 having a substantially planar upper surface 603. Cladding layer 601 has a semi-circular trench 604 formed therein that extends from a first semi-circular terminating end 605 to a second semi-circular terminating end 606. Trench 604 may be formed, for example, by an isotropic etching process. Therefore, trench 604 may have a semi-circular cross section. Trench 604 is filled with a concentrically positioned optically conductive material 607 that has a planar upper surface corresponding to the planar upper surface 603 of cladding layer 602. The first and second terminating ends 605 and 606 have widths w1 and w2, respectively. The radius of terminating end 605, for example, is w½, which may be greater than the radius of trench 604. Similarly, the radius of second terminating end 606, which is w²⁄₂, may be smaller than the radius of trench 604. A top portion having a mirror image of trench 604 formed therein is affixed to the bottom portion 600 to form a complete waveguide. The waveguide may be configured to receive an optical signal medium of a first diameter at the first terminating end and transmit the optical signal to a core of a second diameter, where the second diameter is greater or less than the first diameter. Therefore, the waveguide may be used to communicate an optical signal from a standard sized optical fiber, 8 micrometers, for example, to a substantially smaller optical connection, less than about 1 micrometer, for example, of an optical device. In this configuration the waveguide of the invention essentially operates as a funnel-type of waveguide configured to receive an optical signal, channel the signal to a smaller core, and transmit the signal from the smaller core to a device having a similarly sized core. Additionally, the device may be used in a reverse configuration, i.e., used to transmit optical signals from smaller devices to larger devices through an reverse-funnel configuration. Regardless of the configuration of the funnel feature, the feature may be formed by wet etching the open exposed end of the waveguide trench and maintaining a mask opening that is not tapered or only slightly tapered along its length as it approaches the edge of the cladding.

The core material used for the trench having an increase or decrease in radius may be formed with an refractive index gradient along the tapered length of waveguide. By controlling the rate of refractive index change consistent with the rate of taper per unit length of waveguide, such a waveguide would provide for maximum signal transmission from an standard (~8-micron) core optical fiber to devices that have fundamentally smaller waveguide dimensions, i.e., devices based on silicon and class III/V materials for example. Conversely signals can be transmitted most efficiently from such devices to standard optical fibers by such tapered, refractive-index-graded waveguide features. Using these features, the integrated circuit optical waveguide of the invention may be used in a bank-type configuration to receive a plurality of optical signals from one or more optical fibers. The plurality of optical signals may be received by a bank of optical waveguides of the invention, and then the optical signal may be transmitted an optical integrated circuit element, which may be a switch or other optical element.

While the foregoing is directed to embodiments of the present invention, other and further embodiments of the invention may be devised without departing from the basic scope thereof, and the scope thereof is determined by the claims that follow.

What is claimed is:

1. A method for forming an optical waveguide, comprising:
   depositing a cladding material on a first substrate;
   forming a trench in the cladding material on the first substrate;
   filling the trench with a optically conductive core material;
   planarizing an upper surface of the first substrate;
   depositing the cladding material on a second substrate;
   forming a mirror image trench into the cladding material on the second substrate;
   filling the mirror image trench with the optically conductive core material;
   planarizing an upper surface of the second substrate; and
   affixing the first substrate to the second substrate such that the trench and the mirror image trench are in abutment and form a substantially circular optical core.

2. The method of claim 1, wherein forming a trench and a mirror image trench comprises using an isotropic etching process.

3. The method of claim 2, wherein the isotropic etch process comprises:
   forming a mask over the cladding material having an aperture therein; and
   applying an isotropic etch solution to the cladding material via the aperture.

4. The method of claim 2, wherein the trench and mirror image trench have a substantially semi-circular cross section.

5. The method of claim 3, wherein a width of the aperture is sized to generate a semi-circular cavity in the cladding material when an isotropic etchant is applied to the cladding material through the aperture.

6. The method of claim 1, wherein the optically conductive core material is concentrically positioned within the trench.

7. The method of claim 1, wherein the optically conductive core material is concentrically positioned within the mirror image trench.

8. The method of claim 1, wherein depositing a cladding material comprises using at least one of a spin on deposition process, a physical vapor deposition process, and a chemical vapor deposition process.

9. The method of claim 1, wherein filling the trench and the mirror image trench with an optically conductive core material comprises using at least one of a spin on deposition process, a physical vapor deposition process, and a chemical vapor deposition process.

10. The method of claim 1, wherein planarizing the upper surface of the first substrate and planarizing the upper surface of the second substrate further comprises using a chemical mechanical polishing process.

11. The method of claim 1, wherein affixing the first substrate to the second substrate comprises at least one of an epoxy process, a lamination process, a fusion process, a gluing process, and a mechanical clamping process.

12. The method of claim 1, wherein forming a trench and forming a mirror trench comprises etching a substantially semi-circular trench into the cladding material, the substantially semi-circular trench having a first terminating end and a second terminating end.

13. The method of claim 12, wherein the radius of the first terminating end is larger than the radius of the second terminating end.

14. The method of claim 1, further comprising removing end portions from the first and second substrates.

15. A method for forming a substantially circular optical channel in a waveguide, comprising:
   depositing a cladding layer on a substrate;
   etching a first trench in the cladding layer, the first trench having a semicircular cross section; etching a mirror trench in the cladding layer, the mirror trench having a semicircular cross section;
   filling the first trench and the mirror trench with an optically conductive core material;

planarizing an upper surface of the cladding layer and an area over the first trench and the mirror trench; and folding the mirror trench onto the first trench and affixing it thereto to form a substantially circular optical core.

16. The method of claim 15, wherein etching a first trench and a mirror trench comprises using an isotropic etching process.

17. The method of claim 16, wherein the isotropic etching process comprises:

depositing a mask layer over the cladding layer;

developing trench patterns in the mask layer with a photolithography process; and applying an isotropic etchant to the trench patterns to form trenches in the cladding material.

18. The method of claim 17, wherein a width of the trench patterns is sized to generate a trench having a semi-circular cross section in the cladding layer when the etchant is applied.

19. The method of claim 15, wherein the optically conductive core material comprises glass.

20. The method of claim 15, wherein depositing a cladding layer comprises using at least one of a spin on deposition process, a physical vapor deposition process, and a chemical vapor deposition process.

21. The method of claim 15, wherein filling the first trench and the mirror trench with an optically conductive core material comprises using at least one of a spin on deposition process, a physical vapor deposition process, and a chemical vapor deposition process.

22. The method of claim 15, wherein planarizing comprises using at least one of a chemical mechanical polishing process and an etch back process.

23. The method of claim 15, wherein affixing the mirror trench to the first trench comprises using at least one of an epoxy process and a lamination process.

24. The method of claim 15, wherein the optically conductive core material is concentrically positioned within the trench and the mirror trench.

25. The method of claim 15, further comprising removing end portions of the substrate with a cutting process.

26. An optical waveguide, comprising:

a bottom portion, the bottom portion comprising:
  a bottom substrate;
  a first dielectric cladding layer deposited on the bottom substrate and having a substantially planar first outer surface;
  a semi-circular trench formed in the first cladding layer; and
  an optically conductive core material concentrically positioned in the semi-circular trench and having a first surface that is coplanar with the first outer surface;

a top portion affixed to the bottom portion, the top portion comprising:
  a top substrate;
  a second dielectric cladding layer deposited on the top substrate and having a substantially planar second outer surface;
  a semi-circular mirror image trench formed in the cladding layer; and
  an optically conductive core material concentrically positioned in the semicircular mirror image trench and having an second surface that is coplanar with the second outer surface.

27. The optical waveguide of claim 26, wherein the top portion is affixed to the bottom portion with at least one of a lamination process or an epoxy process.

28. The optical waveguide of claim 26, wherein the trench and mirror trench each comprise a semi-circular channel having a first and second semi-circular terminating ends for receiving optical signals.

29. The optical waveguide of claim 28, wherein the first semi-circular terminating end has a different radius than the second semi-circular terminating end.

30. The optical waveguide of claim 26, wherein the trench of the bottom portion is positioned adjacent the mirror image trench of the top portion.

* * * * *